UNITED STATES PATENT OFFICE.

FRANZ PAUL WERNER, OF MUNICH, GERMANY.

METHOD OF PRODUCING AN IMITATION OF BROCADE OR GOLD CLOTH.

SPECIFICATION forming part of Letters Patent No. 482,604, dated September 13, 1892.

Application filed April 7, 1892. Serial No. 428,223. (No specimens.) Patented in Belgium November 14, 1891, No. 97,197.

*To all whom it may concern:*

Be it known that I, FRANZ PAUL WERNER, manufacturer, a subject of the King of Bavaria, residing at 12 Barerstrasse, Munich, German Empire, have invented a new and useful Method of Producing an Imitation of Brocade or Gold Cloth, (for which I have obtained Letters Patent in Belgium, dated November 14, 1891, No. 97,197,) of which the following is a specification.

My invention relates to a method of producing an imitation of brocade or gold cloth, and has for its object to produce an inexpensive but durable imitation superior to those hitherto attempted. With former imitations the metallic covering was easily broken and the texture of the original fabric very imperfectly shown up, which greatly detracted from the beauty of its appearance. Besides obviating these defects in the material the present method itself possesses the advantage over other methods of gilding—such, for instance, as gilding with white lead—of being uninjurious to the health of the workmen. This method is carried out as follows: The material forming the groundwork, which is a woven fabric of hemp, flax, wool, cotton, silk, bast, jute, &c., is stretched over a surface of the greatest possible smoothness and then thoroughly moistened with gelatine dissolved or boiled in water, and to which a small quantity of spirit is added. This operation is conveniently effected by means of a sponge. As gelatine generally forms beads when being applied as a coating, spirit (such as spirit of ethylic alcohol, for instance) must be added to it in the present case, so as to allow the operation of coating or moistening to be effected uniformly and quickly. After the fabric moistened with the spirituous gelatine liquid has dried it is coated, preferably by means of a large brush, with the "ground" hereinafter described, and preferably dabbed with a dabbing-brush for the purpose of retaining, as far as possible, the original porousness or the original form of surface. This ground consists of a thick flour paste scalded with hot water and mixed with Venetian turpentine. In order that this ground produced thereby shall not become hard or brittle, the flour paste must be thinned with ox-gall until it is capable of being brushed on. The ground produced in this manner with the greatest care and made as uniform as possible is when dry brushed over one or more times, so as to obtain a uniform surface, with leather collodion, which consists of ordinary collodion with a small quantity of castor-oil. Instead of such leather collodion, shellac (preferably light-colored) may be used. After this coating has dried it is coated with "French mixture," a compound obtainable in commerce, with which may advantageously be mixed about ten per cent. of tenacious varnish to prevent staining or absorption. After about ten to fifteen hours the whole is covered with the leaf metal—such as gold leaf or silver leaf, real or imitation—designed for the cloth, and is then well brushed, whereupon it is coated with alcoholic shellac solution, to which is added with advantage ten per cent. of mastic. By means of the method described the material—such as woven fabric of hemp, flax, wool, silk, cotton, bast, jute, &c.—can be treated in whole pieces and either over its entire width or over portions of its surface, and a product is obtained which, in consequence of this peculiar method, possesses considerable advantages over the imitations hitherto tried of brocade or gold cloth. A material of this kind retains its original softness, the mass incorporated therewith does not become brittle, and the metal does not break off, even though the material be roughly handled, so that the said material is very durable. The material after the treatment described still shows clearly the structure of the woven fabric, and, aided by its great durability, which is even greater than that of the gilded and polychromed leather, as used at present, it can be embroidered upon, printed upon, painted upon, and can be employed with advantage for the most various purposes, such as for wall-hangings, furniture materials, coverings for ball-shoes and house-shoes, screens, &c.

I claim as my invention—

1. The method of producing imitations of brocade or gold cloth, consisting in coating a textile fabric, first, with spirituous gelatine; secondly, with a ground consisting of a flour paste mixed with Venetian turpentine and ox-gall; thirdly, with collodion having castor-oil or the described equivalent added thereto; fourthly, with French mixture, to which has been added tenacious varnish; fifthly, with leaf metal, and, finally, with an alcoholic shellac solution, substantially as set forth.

2. As a new article of manufacture, an imitation of brocade or gold cloth, which consists of a textile fabric covered wholly or partially with coatings, first, of spirituous gelatine; second, of a ground composed of flour paste mixed with Venetian turpentine and ox-gall; third, of collodion and castor-oil or the described equivalent; fourth, of French mixture; fifth, of leaf metal, and, finally, of alcoholic shellac solution, substantially as set forth.

In testimony whereof I have signed my name to this specification in the presence of two subscribing witnesses.

FRANZ PAUL WERNER.

Witnesses:
 BERNHARD GRÜNSTÄNDT,
 WOLFGANG BRACHINGER.